(12) United States Patent
Shearer et al.

(10) Patent No.: US 11,742,100 B2
(45) Date of Patent: Aug. 29, 2023

(54) DEPRESSURISATION VALVE

(71) Applicant: ROLLS-ROYCE SMR LIMITED, Derby (GB)

(72) Inventors: Brenton D Shearer, Derby (GB); James C Palmer, Derby (GB); Benjamin J Ireland, Derby (GB)

(73) Assignee: ROLLS-ROYCE SMR LIMITED, Derby (GB)

( * ) Notice: Subject to any disclaimer, the term of this patent is extended or adjusted under 35 U.S.C. 154(b) by 65 days.

(21) Appl. No.: 17/851,682

(22) Filed: Jun. 28, 2022

(65) Prior Publication Data

US 2022/0406478 A1  Dec. 22, 2022

Related U.S. Application Data

(62) Division of application No. 16/689,481, filed on Nov. 20, 2019, now Pat. No. 11,521,758.

(30) Foreign Application Priority Data

Dec. 13, 2018 (GB) ...................................... 1820328

(51) Int. Cl.
*G21C 9/004* (2006.01)
*F16K 17/04* (2006.01)
*F16K 31/06* (2006.01)

(52) U.S. Cl.
CPC ............ *G21C 9/004* (2013.01); *F16K 17/048* (2013.01); *F16K 17/0486* (2013.01); *F16K 31/06* (2013.01); *Y10T 137/7737* (2015.04)

(58) Field of Classification Search
CPC .. F16K 17/048; G21C 15/18; Y10T 137/7758

(Continued)

(56) References Cited

U.S. PATENT DOCUMENTS 2,232,502 A  2/1941  Wittmann
3,766,940 A  10/1973  Mason
(Continued)

FOREIGN PATENT DOCUMENTS

CN  108223867 A  6/2018
EP  0197291 A1  10/1986
(Continued)

OTHER PUBLICATIONS

Jun. 13, 2019 British Search Report issued in British Patent Application No. 1820328.1.

(Continued)

*Primary Examiner* — Robert K Arundale
(74) *Attorney, Agent, or Firm* — Oliff PLC

(57) ABSTRACT

A depressurisation valve for a cooling system including a main chamber having a main valve, a pilot line having a secondary valve and a blowdown line; the main valve being located to seal a path of the coolant system of the nuclear reactor. The main chamber is connected to the cooling circuit via the pilot line allowing coolant to enter the main chamber, and the blowdown line allows coolant to escape from the main chamber, the pilot line having a lower fluid resistance than the blowdown line. The pressure of coolant in the main chamber maintains the main valve in a closed position, and under elevated temperature and/or pressure conditions fluid is prevented from entering the main chamber via a closure of the secondary valve on the pilot line and reduce the pressure from the valve, moving it to its open position.

7 Claims, 3 Drawing Sheets

(58) Field of Classification Search
USPC .......................................................... 376/283
See application file for complete search history.

(56) References Cited

U.S. PATENT DOCUMENTS

| | | | | |
|---|---|---|---|---|
| 4,603,708 | A * | 8/1986 | Altmann | F15B 1/0275 |
| | | | | 137/488 |
| 5,028,383 | A * | 7/1991 | Moore | F16K 17/02 |
| | | | | 376/277 |
| 2010/0043899 | A1 | 2/2010 | Evanno et al. | |
| 2015/0194225 | A1 | 7/2015 | Watson et al. | |
| 2017/0133111 | A1 | 5/2017 | Laborda Rami | |
| 2020/0194135 | A1 * | 6/2020 | Shearer | G21C 9/004 |

FOREIGN PATENT DOCUMENTS

| | | | | |
|---|---|---|---|---|
| JP | 2016-003901 A | 1/2016 | | |
| WO | 95/24719 A1 | 9/1995 | | |
| WO | WO-9524719 A1 * | 9/1995 | | G21C 9/004 |
| WO | 2008/132426 A1 | 11/2008 | | |

OTHER PUBLICATIONS

Mar. 31, 2020 Extended European Search Report issued in European Patent Application No. 19209340.9.
Dec. 6, 2021 Search Report issued in European Patent Application No. 21187699.0.
Aug. 17, 2022 Notice of Allowance issued in U.S. Appl. No. 16/689,481.

* cited by examiner

DEPRESSURISATION VALVE

CROSS-REFERENCE TO RELATED APPLICATIONS

The present application is a divisional of U.S. patent application Ser. No. 16/689,481 filed on Nov. 20, 2019, which claims the benefit of priority to United Kingdom Application No. GB 1820328.1 filed on Dec. 13, 2018. The contents of these applications are incorporated herein by reference in their entirety.

BACKGROUND

Field of the Disclosure

The present disclosure concerns a passive depressurisation valve for a nuclear reactor.

Description of the Related Art

Nuclear reactors are a desirable addition to a power grid as they present ideal base load stations. This is because they are considered a low carbon source of electricity and are not dependent upon variable weather conditions, which are limiting factors for other low carbon sources. These features allow them to be used as the backbone of a complete electricity network. One of the most common types of nuclear reactors used around the world is the pressurised water reactor (PWR) in which a primary circuit of pressurised water is used as the coolant, moderator and as well as the heat transfer fluid to the steam generator. The relative simplicity of the system provides them with the advantage that these systems can be scaled. Consequently, they are suitable for both large scale power plants as well as for small modular reactors. However, as with all nuclear power stations they require a robust safety system to prevent accidents.

Modern safety systems for nuclear reactors aim to be both active and passive. Active systems operate under the control of an operator and/or running systems, such as pumps and generators, which in normal operation are associated with emergency control. Passive safety systems do not require any external operator input or active systems running in order to operate. This latter system is beneficial as it allows for automatic self-control of the system that is not requisite on external power or user input. In emergency situations this is desirable as, in certain cases, power to the reactor may be disrupted or it may not be possible for operators to control the system manually in which case passive control systems allow the system to remain safe.

In the case of a pressurised water reactor one of the main safety concerns is a Loss of Coolant Accident (LOCA) event, in which the cooling water entering into the reactor is lost and would, if not rectified, lead to the failure of a nuclear reactor. This is because without the coolant, the heat produced by the radioactive decay within the fuel rods of the reactor would increase to a point at which the reactor is damaged. This could result in a serious nuclear incident. One of the ways that this can occur is if the coolant boils, which can lead to the melt of the fuel clad and the release of the fission products. Consequently, to prevent this from happening nuclear reactors are equipped with emergency cooling systems that can replace the cooling water if there is a fault. In a PWR the system to protect against this is known as the Emergency Core Cooling System (ECCS). These systems typically involve the opening of pipelines to discharge the present reactor coolant. The discharge pipework for this is engineered to provide sufficient capacity to remove the heated coolant, whilst maintaining a low reactor circuit pressure. In order to replace this discharged coolant, fresh coolant is injected, under the force of gravity, into the system. These discharge pipelines are normally isolated from the reactor using isolation vales, which can be opened upon the detection of a LOCA. Typically this involves instrumentation to monitor the parameters of the plant, a control system to generate initiation signals on reaching set points and valve actuators to change the valve positions.

Systems to achieve this isolation of the coolant from the emergency supply of cooling fluid in the event of a LOCA are known in the art. Accumulator Isolation Passive Valve (AIPV) are used to isolate the pressurised accumulator at 55 bar and the core at 70 bar during normal operation when there is a reduction of pressure in the reactor circuit, the valve opens proportional to the difference in pressure between the accumulator located upstream and the reactor circuit and the core downstream. For the AIPV, since the valve position is proportional to the pressure difference, once the pressure equalises, either due to a recovery of reactor circuit pressure or from a discharge of accumulator pressure, the valve shuts, isolating the line once again. The valve therefore does not remain latched open to allow for complete system depressurisation. Alternatively, an Automatic Safety Valve for Accumulator Depressurisation (AS-VAD) valve can be used. These are used to vent gas from the gas space of an accumulator by opening a valve when the force applied from the pressure in the system drops below a level, which is set by the force applied by the spring acting on the valve plunger. The ASVAD valve is not an isolation valve in the usual sense, but is specifically designed for the venting of gas. As such, it is not suitable for the isolation of high pressure, high temperature water. As neither valve operates based upon temperature and cannot open in the event of an intact circuit fault transient in which the system pressure and temperature rise, as such improvements are required. The AP1000 reactor design by Westinghouse features a valve for discharging the heated coolant—termed the Squib Valve. The Squib valve is equipped with an explosive charge that is used to open the valve; however, spurious operation of the squib valve could result in a major radiological hazard. Consequently, the safety justification of the plant design is dependent upon a highly reliable Control and instrumentation (C&I) system to prevent spurious operation, and as such adds significant cost to the plant design. As such there is a desire to develop a simplified passive valve to allow for depressurisation of the coolant circuit.

SUMMARY OF THE DISCLOSURE

According to a first aspect there is provided a depressurisation valve for a cooling circuit comprising a main valve having a piston and valve stem located in a main chamber, the main chamber being connected to a fluid supply via a pilot line with a secondary valve and a blowdown line, wherein fluid enters the main chamber via the pilot line, which has a lower fluid resistance than the blowdown line; and wherein in use the pressure of the fluid in the main chamber maintains the main valve in a closed position, and under extreme conditions fluid is prevented from entering the main chamber via a closure of the secondary valve on the pilot line and reduce the pressure from the valve, moving it to its open position.

The use of an opening valve as the passive valve allows for complete depressurisation of the core circuit. Furthermore, the valve can be applied in a number of configurations in which the valve can be positioned. Consequently, this valve acts as an improvement over the prior art and does not require the explosive charges required by the Squib.

The secondary valve on the pilot line may be a magnovalve.

The secondary valve on the pilot line may be a high pressure latching isolation valve.

A poppet valve may be used to further seal the main chamber from the pilot line.

The depressurisation valve may be located upstream of an automatic isolation valve.

The blowdown line may be provided outside of the main chamber.

The blowdown line may be provided inside the main chamber.

According to a second aspect there is provided a nuclear reactor that includes a depressurisation valve as discussed above.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF THE DISCLOSURE

Emergency core cooling systems (ECCS) are provided to ensure the safe shutdown of a nuclear reactor when accident conditions arise. The cooling system is configured to provide a safety mechanism in the event of a variety of accident conditions. There are a number of sub-systems that go into forming the ECCS, each having redundancies, so that the reactor can be safely shutdown even if there is a failure in one of the sub-systems. Of particular interest here are the passive systems such as an Automatic Depressurisation System (ADS), which consists of two valves that open to depressurise the main coolant system and to allow the lower pressure emergency coolant systems to function. Because the low pressure coolant injection systems have larger cooling capacities than the high pressure systems the efficient operation of these in shutting down the reactor is very important.

Figure 1:
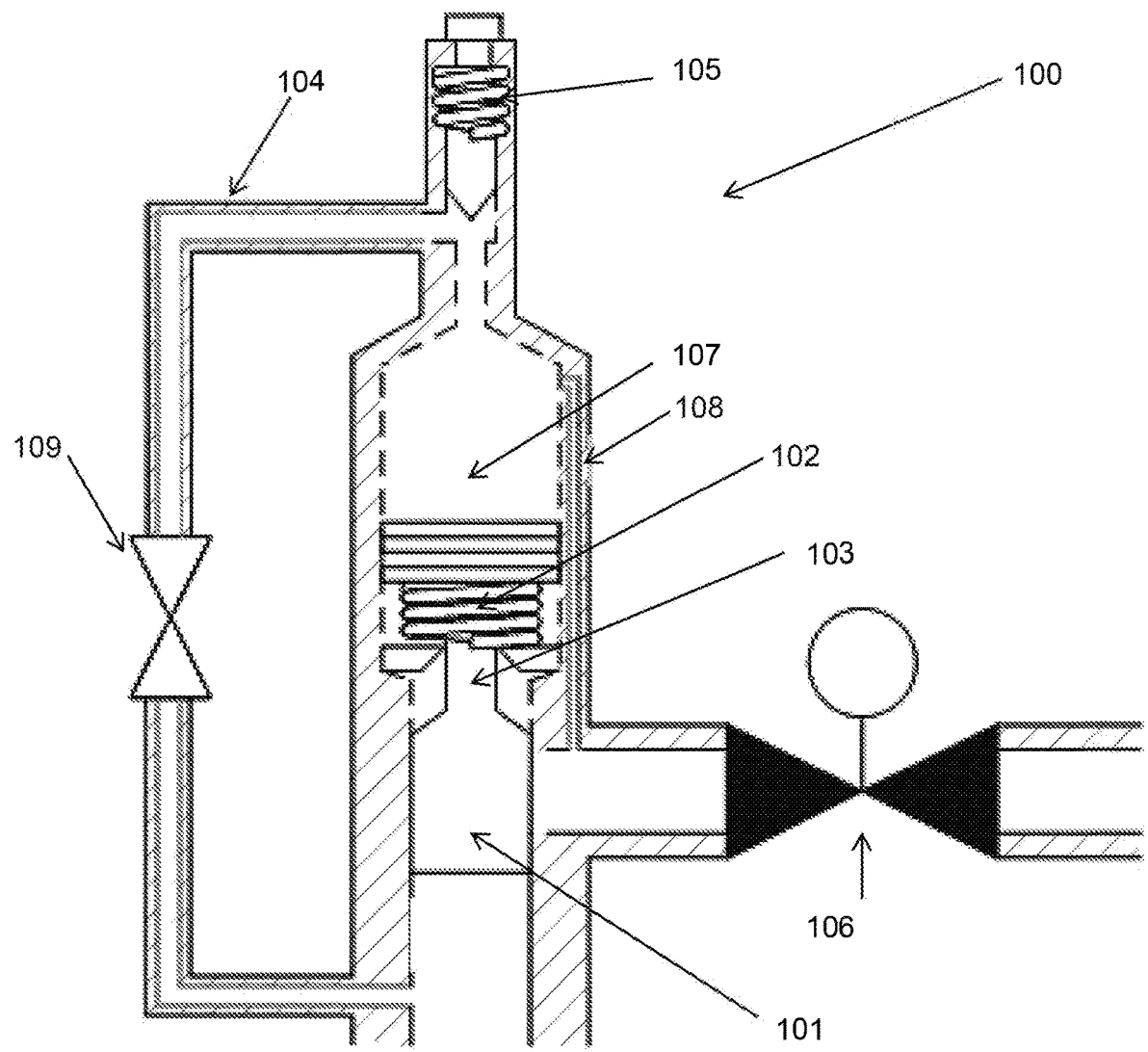
FIG. 1 is a schematic of a first embodiment of the automatic depressurisation valve of the present disclosure.

A Passive Depressurisation (PaD) Valve is normally a shut valve, which lies in the discharge pipe lines extending from the reactor circuit. It provides a second and diverse method of isolation from other control system initiated/actuated isolation valves which are located in the same discharge line. The PaD valve is designed to change from a shut state to an open state upon the detection of increasing temperature and/or decreasing pressure upstream of the valve. The advantage of the incorporation of such a system is that the valve will open in the event of a significant LOCA, or elevated reactor circuit temperature to discharge reactor coolant and allow for the injection of fresh coolant under gravity. A schematic example of such operation is shown in FIG. 1. In this PaD valve 100 has a main valve 101 mounted upon a compression spring 102, which is forced down by fluid pressure to be in a closed position. However, when the fluid pressure drops the spring pushes a valve piston coupled to a valve stem 103 up and opens the main valve 101. It is through the movement of the valve piston and stem relative to the coolant system pipeline to which it is connected that causes the main valve to open and close. With the main valve in the shut/closed position the fluid in the upstream reactor coolant circuit passes through the bypass or pilot line 104. Pressure in the system is also high enough to force open a pilot poppet valve 105 and to force the valve piston coupled to the valve stem 103 of the main valve 101 down into a closed position. The system remains in this position whilst the Automatic initiation valve (AIV) 106 is shut, and the main valve spring remains compressed by the reactor circuit pressure. If the AIV is opened by the control and instrumentation (C&I) system, which occurs in the event of low circuit pressure or high reactor fluid temperature, fluid escapes from the main chamber 107 via the blowdown line 108. This escape of fluid will be accompanied by the automatic closure of secondary valve 109, if the fluid temperature exceeds the critical temperature in the magnovalve. The opening of the AIV and the closing of the secondary valve will result in the reduction of pressure in the reactor circuit and ultimately in the main chamber, such that the main valve can be opened, as there is not enough pressure acting upon the valve mechanism spring to keep it closed. The secondary valve 109 can take various forms, for example it may be a magnovalve.

The blowdown line 108 is configured such that the resistance to fluid flow is higher down the blowdown line than it is through the pilot line. In the event of a spurious AIV opening a small slow leak of fluid passes through the AIV, but the flow into the main chamber via the pilot line is greater than out of the chamber via the blowdown line. Thus the pilot poppet spring and the main valve spring 102 remain compressed and consequently the main valve 101 is maintained shut. This state will occur for as long as there is enough pressure in the main chamber to compress these springs. In the event of a LOCA and a subsequent opening of the AIV, where the reactor circuit pressure is not maintained, the force provided by the reactor circuit fluid pressure in the pilot line drops to a level below the pilot poppet spring force resulting in a shutting of the pilot poppet valve. This cuts off the flow to the main chamber from the reactor circuit and the fluid in the main valve chamber escapes via a blowdown line. This results in the force exerted on the main valve spring by the fluid pressure drops, allowing the spring to extend and thus opening the main valve.

In the event of an intact circuit fault and subsequent AIV opening, the reactor circuit fluid temperature rises. Reactor circuit coolant passes through the pilot line, through the main valve chamber and down the blowdown line until the trip temperature of the of the secondary valve 109, in the form of a magnovalve, is reached which causes the secondary valve to shut. Closure of the secondary valve 109 therefore cuts off the flow of water from the pilot line into the main valve chamber 107. As there is no fluid entering the main chamber and the fluid that is present within it is able to escape via the blowdown line and the main valve chamber pressure falls. This allows the spring of the pilot poppet valve to overcome the force of the fluid pressure shutting the pilot poppet valve 105 with the main chamber sealed to incoming water it is able to depressurise causing and the main valve 101 to open. With the main valve 101 open depressurisation of the coolant system can occur.

In this configuration the main valve could be configured to open at temperatures greater than a threshold, i.e. above the normal average operating temperature which is around 312° C. For example, the main valve could be set to open when the coolant temperature reaches about 330° C. It could also open at a higher temperature of about 335° C. or about 340° C. higher. In choosing the main valve opening temperature the design must take into account fluctuations within the coolant temperature and not open during these, but open at a level that would be beyond the normal operating parameters. The poppet valve could be set to close at any suitable pressure below the normal operating pressure of about 155 bar. For example, this could be at about 70 bar. It could also be at pressures higher than 70 bar, such as at about 75, 80, 85, 90 bar, or for pressures lower, such as at about 65, 60, 55, or 50 bar.

In this embodiment the valve arrangement provides a positive means of isolating the reactor circuit from the discharge location until demanded. The inherent design of the main valve and use of a magnovlve and poppet valve allows for the opening of the main valve to be based on both low pressure and high temperature conditions. Such configuration has the benefit that it will not result in a significant hazard in the event of a single spurious AIV valve opening or in a C&I failure.

Figure 2:
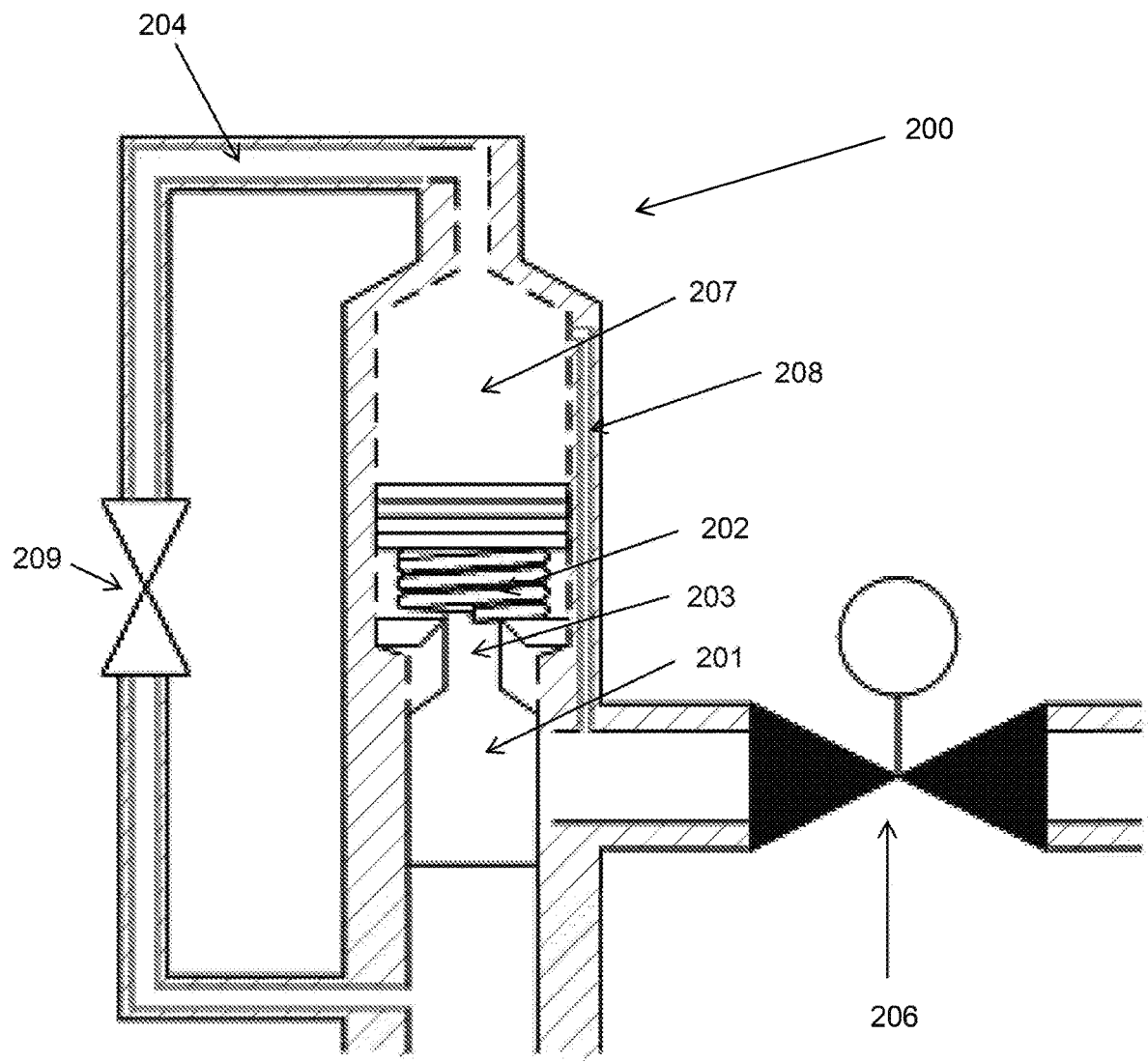
FIG. 2 is a schematic of a second embodiment of the automatic depressurisation valve of the present disclosure.

A second embodiment of a PaD valve 200 removes the requirement for the pilot poppet valve; this embodiment is shown in FIG. 2. This configuration is similar in operation to that of the embodiment shown in FIG. 1. The main valve 201 is maintained in normal operation in a closed position within the circuit. It is maintained in this position by the fluid pressure from the coolant circuit passing through a pilot line 204 into a main chamber 207 at the back of a valve piston coupled to a valve stem 203. The fluid acts by applying a force on the valve piston and forces a compression spring 202 down, such that the main valve is maintained in the closed position. A blowdown line 208 is also provided to maintain fluid flow through the chamber. The blowdown line is narrower than the pilot line so that pressure in the main chamber is maintained. The pilot line is provided with secondary valve 209 for example this can be in the form of a magnovalve, which is thermally activated; this means that if the fluid temperature rises above a certain limit the magnovalve closes and stops the flow of fluid into the main chamber. With the restriction of flow into the main chamber the presence of the blowdown line allows fluid to escape from the main chamber. A magnovalve is a magnetic valve, which when heated above the valve material's Curie Point temperature loses its magnetism and thus allows the valve to move in relation to this change of state, allowing the valve to open and/or close. This therefore reduces the pressure acting on the valve piston, as such the compression spring 202 can expand and the main valve 201 can open to allow the fluid to drain from the main reactor circuit via the AIV 206. The removal of the pilot poppet valve has the benefit of reducing the number of components within the system, but removes the sealing effect of the poppet valve, and the extra pressure control it provides, due to its higher degree of accuracy with respect to the pressure at which the main valve operates at.

An alternative to the use of the magnovalve for the secondary valve 209 would be the use of a fusible plug valve, this makes use of a low melting material in the plug to melt and seal the valve if the temperature of rises. This results in the permanent sealing of the valve and as such is very effective at sealing however they would need to be replaced after operation. Another alternative is the use of a eutectic valve, which also acts as a will melt the eutectic material sealing the secondary valve, which will result in the opening of the main valve.

Figure 3:
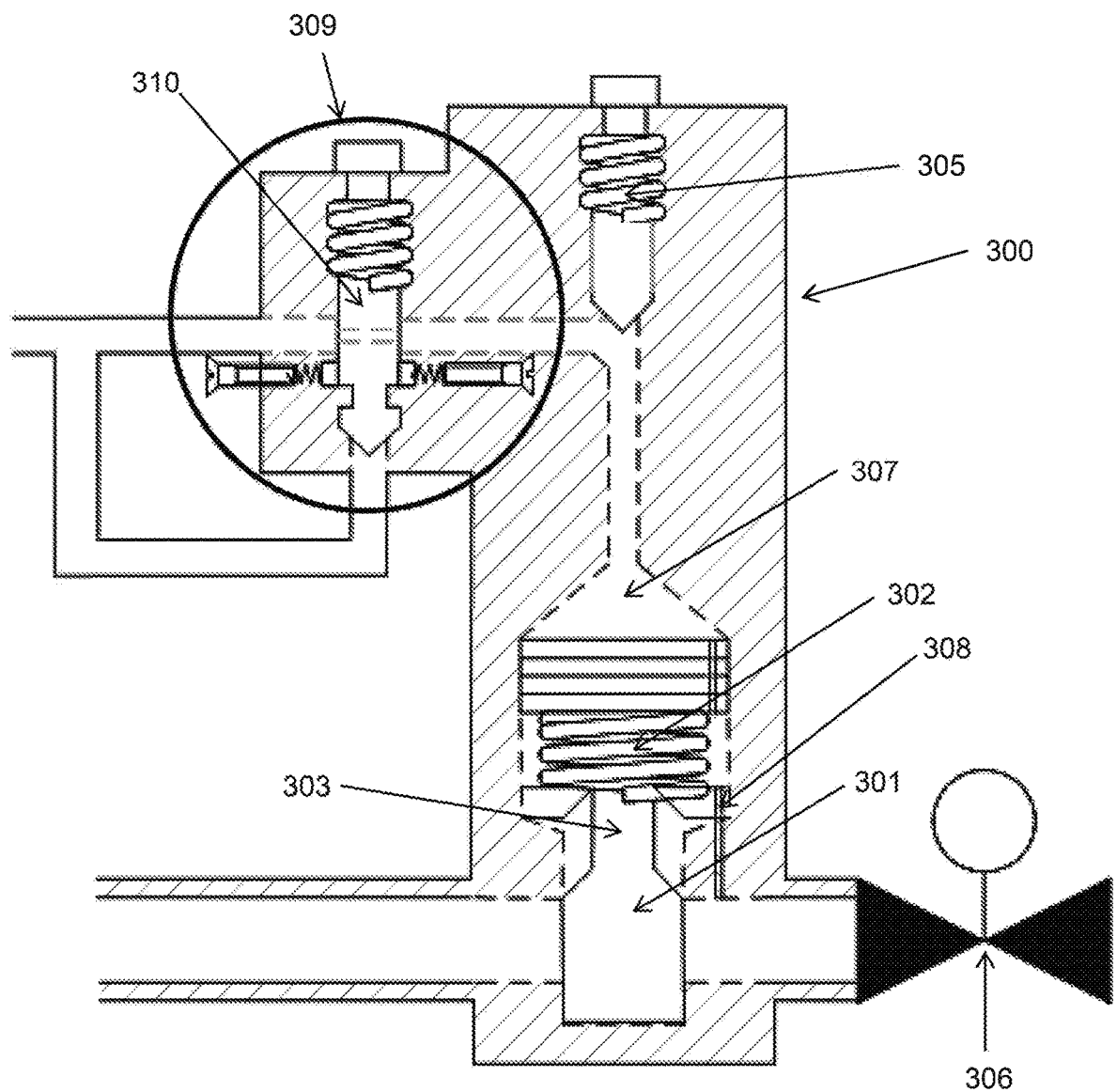
FIG. 3 is a schematic of a third embodiment of the automatic depressurisation valve of the present disclosure.

A third embodiment of a PaD valve 300 of the present disclosure is presented in FIG. 3. In this example the secondary valve 309 incorporates a high pressure latching isolation valve 310 mounted on a pilot line 304; this acts as a pressure sensing line. This line works rather than on a thermal set point for closure of the valve, but rather it shuts down upon the detection of high pressures. The latching valve can be set to close at any suitable pressure that is outside of the normal operation of the cooling circuit. For example, the latching valve could be set to close at 16.5 MPa. The valve could also be set to close at pressures higher than this, for example at about 16.6, 16.7, 16.8, 16.9 17, 17.1, 17.2 17.3, 17.4, 17.5 MPa or higher. Or lower, for example at about 16.4 or 16.3, 16.2, 16.1 or 16 MPa. During normal operation of the reactor the typical pressure of the coolant will cause the fluid to flow along the dotted line. This pressure also retains the poppet valve in the open position. If however, the pressure in a circuit drops as the result of a LOCA event, the lower pressure acting against the poppet valve 305 will not be enough to maintain the poppet valve in the open position. As such the poppet valve will close and fluid can flow down the blowdown line 308 from the main chamber; this resulting in a reduction of the pressure in a main chamber 307. This will in turn reduce the pressure acting upon a valve piston coupled to a valve piston and stem 303, such that a compression spring 302 can expand and the main valve 301 is able to open and fluid can flow down to the AIV 306. If on the other hand the pressure increases, which can be associated with an intact circuit fault, the fluid pressure in the system forces the high pressure latching isolation valve 310 upwards, thus closing the fluid flow path through the pressure release valve. With the lack of fluid flow into the main chamber, the pressure is reduced within this chamber as fluid is able to pass through the blowdown line and reduce the pressure in the main chamber, thus opening the main valve. Although, this is shown as a straight through design, it will be appreciated that this configuration is also suitable for use in an angled design. Like that shown in FIGS. 1 & 2 as well.

Although the above embodiments have been described in light of a nuclear reactor it will be appreciated that the device can be used in any other system where it is important to depressurise a system or discharge the contents of a pressurised system if it reaches a pressure below or above its normal operating pressure. Similarly it can be used in any similar systems where such a discharge/depressurisation is important if there temperature increase above a set point. As the person skilled in the art would appreciate that these valves could be configured to work in different situations from an open to shut scenario with routine modification.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A depressurization valve for a cooling circuit comprising: a main chamber having a main valve, the main valve being located to seal a path of the cooling circuit, and a pilot line having a secondary valve, and a blowdown line, the main chamber being connected to the cooling circuit via the pilot line, the pilot line allowing coolant to enter the main chamber, the blowdown line allowing coolant to escape from the main chamber, and the pilot line having a lower fluid resistance than the blowdown line, wherein: in normal operating conditions, the main valve is configured to be maintained in a closed position by a pressure of the coolant, and under elevated pressure conditions, with respect to the normal operating conditions, the main valve is configured such that when fluid is prevented from entering the main chamber via closure of the secondary valve on the pilot line, pressure on the main valve is reduced and the main valve moves to an open position, and the secondary valve is a pressure responsive latching isolation valve.

2. The depressurization valve as claimed in claim 1, wherein a pilot poppet valve is used to further seal the main chamber from the pilot line.

3. The depressurization valve as claimed in claim 1, wherein the depressurisation valve is located upstream of an automatic isolation valve.

4. The depressurization valve as claimed in claim 1, wherein the blowdown line is provided in a space outside of the main chamber.

5. The depressurization valve as claimed in claim 1, wherein the blowdown line is provided in a space inside of the main chamber.

6. The depressurization valve as claimed in claim 1 for use in a nuclear reactor cooling circuit.

7. A nuclear reactor including the depressurization valve of claim 6.

* * * * *